United States Patent [19]

Sternberg et al.

[11] 3,956,514

[45] May 11, 1976

[54] PROCESS FOR PREPARING WET SPUN PROTEINACEOUS FILAMENTS

[75] Inventors: Moshe M. Sternberg, South Bend; Chong Yol Kim, Elkhart, both of Ind.

[73] Assignee: Miles Laboratories, Inc., Elkhart, Ind.

[22] Filed: Sept. 25, 1974

[21] Appl. No.: 509,287

[52] U.S. Cl. ............................ 426/276; 264/202; 426/515; 426/516; 426/802
[51] Int. Cl.² ........................ A23L 1/36; A23P 1/00
[58] Field of Search ........... 426/276, 802, 274, 515, 426/369, 516, 373, 372, 431, 436, 459, 212, 364; 264/202

[56] References Cited
UNITED STATES PATENTS

| | | | |
|---|---|---|---|
| 2,682,466 | 6/1954 | Boyer............................ | 426/212 X |
| 2,785,155 | 3/1957 | Anson et al.................... | 426/802 X |
| 3,468,669 | 9/1969 | Boyer et al. ................... | 426/276 |
| 3,809,767 | 5/1974 | Sait................................. | 426/364 |
| 3,814,823 | 6/1974 | Yang et al. .................... | 426/802 X |
| 3,870,801 | 3/1975 | Tombs............................ | 426/276 X |

*Primary Examiner*—S. Leon Bashore
*Assistant Examiner*—Kenneth M. Schor
*Attorney, Agent, or Firm*—Richard W. Winchell

[57] ABSTRACT

Wet spun proteinaceous filaments are prepared from pulverized, functional defatted leguminous materials having a protein content of about 45 to about 55 percent, by forming an aqueous slurry thereof to extract proteins and carbohydrates, precipitating the protein onto and into the insoluble portion of the leguminous material, separating the solids from the liquid portion of the slurry, forming an aqueous alkaline spinning dope with the separated solids and forcing the spinning dope through a spinneret into an acid and salt coagulating bath to form proteinaceous filaments.

12 Claims, No Drawings

PROCESS FOR PREPARING WET SPUN PROTEINACEOUS FILAMENTS

BACKGROUND AND PRIOR ART

One of the more pressing food problems facing the world today is the shortage of protein for human consumption. Many of the available proteins, such as those of plant and microbial origin, can be supplied in nutritional form but are generally unacceptable because of undesirable taste, flavor or texture. Most humans prefer the chewiness and mouthfeel characteristics of real meat. In order to make plants and microbial protein more palatable, food technologists have developed various methods to give the protein a textured or fibrous quality similar to real meat.

Prior art techniques for producing protein fibers have employed such diverse vegetable proteins as corn, cottonseed, peanut, rapeseed, safflower seed, and soybean protein. One of the most successful prior art techniques has been the wet spinning process developed by R. A. Boyer and disclosed in U.S. Pat. No. 2,682,466. In the Boyer process, protein fibers are prepared by forming an alkaline aqueous solution of the protein which is then extruded into an acid and salt coagulating bath to form fibers. One of the drawbacks in commercial practice of the Boyer process has been in the preparation of the material to be wet spun. It must be both bland in flavor and highly functional.

The functional properties of the protein encompass physicochemical properties such as dough-forming, water adsorption, fat-binding, emulsifying, foaming, film-forming, gelling, cohesiveness, adhesiveness, elasticity, etc. As used herein, the term "functional" means having sufficient collective characteristics to be capable of eventually forming acceptable wet-spun fibers. Generally, the functional properties of a protein will depend on the source, purity and degree of denaturation of the protein. Some proteins, such as safflower seed protein, require little purification and yet are functional as disclosed by L. F. Elmquist in U.S. Pat. No. 3,176,909. Other proteins, such as cottonseed, legumes, rapeseed, etc., however, contain undesirable carbohydrates and have "off" flavors such that only a highly purified form thereof will provide a satisfactory functional and bland starting material.

For example, when a soybean protein is used in the Boyer process, it is necessary to prepare a soy isolate which is a highly purified protein containing at least 90 percent protein. Preparation of the soy isolate is complex and time consuming and invariably results in the loss of functional protein. As a result, the use of soy isolate in the Boyer process is not totally satisfactory and substantially increases the cost of producing protein fibers.

Further difficulties are encountered in commercial practice of the Boyer process in the preparation of the spinning solutions. Conventional spinning solutions are usually prepared in large batches by dissolving the soy isolate in aqueous alkali and then ageing the solution. Depending upon the particular conditions of pH, solids content and temperature, the spinning solution will increase in viscosity until a spinnable viscosity is obtained. Under optimum conditions, the spinnable viscosity, i.e., 50,000 to 100,000 centipoise, is reached within 15 to 30 minutes and continues to increase thereafter to a maximum viscosity, after which it begins to decrease. As a result, the ageing process is time consuming and requires almost constant supervision to monitor viscosity.

SUMMARY OF THE INVENTION

We have now discovered that wet spun proteinaceous filaments can be produced from selected, low purity, defatted functional leguminous material by a process which does not have the inherent disadvantages of the prior art techniques previously described.

In accordance with the present invention, a novel process is provided for the production of wet spun proteinaceous filaments which comprises pulverizing to an average particle size less than about 14 microns a functional defatted leguminous material, such as soybean, peanut, or pea, having a protein content of about 45 to about 55 percent; forming an aqueous slurry of the pulverized leguminous material and agitating the aqueous slurry to extract the proteins and carbohydrates without denaturing the protein; adjusting the pH of the slurry to about the isoelectric pH of the protein to thereby precipitate the protein on and into the insoluble portion of the leguminous material; separating the solid and liquid portions of the slurry; forming an aqueous spinning dope with the freshly separated solids; adjusting the pH of the spinning dope to an alkaline pH to develop spinnable viscosities; and thereafter forcing the spinning dope through a spinneret into an acid and salt coagulating bath to form proteinaceous filaments.

DESCRIPTION OF THE INVENTION

The starting material used in the process of the present invention is a dehulled, defatted and functional legume having a protein content of about 45 to about 55 percent on a dry weight basis. Such legumes include beans, lentils, peas, peanuts, soybeans, etc. The most preferred leguminous starting material is soybean.

Soybeans are presently available as dehulled and defatted soy flake or soy flour having a protein content of about 48 to 55 percent on a dry weight basis. Soy flake is commercially prepared by contacting the dehulled and flaked soybean with an organic solvent to extract the oil, and the solvent-wet soybean is than flash-dried to remove the solvent. Alternatively, soy flour is prepared by grinding the desolventized soy flake to a flour such that 97 percent of the flour will pass through a No. 100 U.S. Standard Screen (150 micron screen opening). Often the functional properties, e.g., water adsorption, cohesion, elasticity, etc., of the leguminous material are found to vary widely depending upon the particular variety and quality of the legume used in the preparation of the defatted material. In addition, excessive heat treatment during processing often tends to partially denature the protein and thus adversely affects the protein's functional properties.

The combination of functional protein deficiency and relatively high concentration of carbohydrates, crude fiber and debris found in low purity leguminous material, has previously made it impossible to produce wet spun proteinaceous filaments from these materials. Prior art techniques have avoided these problems by further processing the legume, in particular soy flake or flour, to produce a costly protein isolate containing at least 90 percent protein.

Practicing the present process, we have now found it is possible to produce wet-spun proteinaceous filaments from selected low-purity leguminous materials, i.e., having a protein content of about 45 to about 55 percent. Whether a particular legume will be suitable for this process can be determined readily by any simple physical or chemical test used to predict the functional properties of protein. When soybean materials are used in this process, we have selected two such tests, i.e., beta-amylase activity and nitrogen solubility index, merely for their simplicity, and have found these results to correlate quite well with the functional performance of the protein. While we have selected beta-amylase activity as one indicator of functional properties, the amount of activity or presence of other enzymes in the leguminous material, e.g., urease, may also be used as an indicator of functional properties.

We have found that when soybeans are used, an acceptable soy flake or soy flour must have, as a minimum, a nitroen solubility index of at least about 60 percent. Better fibers are produced from soybean materials which have a beta-amylase activity of at least 10 beta-amylase units/gram and a nitrogen solubility index of at least about 60 percent. Preferably, the soybean material will have a beta-amylase activity of at least about 12 beta-amylase units/gram and a nitrogen solubility index of at least about 66 percent. Most preferably, the soybean material will have a beta-amylase activity of at least 16 beta-amylase units/gram and a nitrogen solubility index of at least about 74 percent. Soybean materials with a beta-amylase activity much less than 10 beta-amylase units/gram or nitrogen solubility indexes much less than 60 percent will produce poor fiber, if at all, of low tensile strength and low cohesiveness which cannot satisfactorily be formed into tows of filaments and stretched.

The soy flake or flour used as the starting material is assayed for beta-amylase activity in the following manner. A starch substrate is prepared by adding a slurry of 1.25 grams (moisture-free basis) of soluble starch in distilled water. Gently boil for 3 minutes with nearly constant stirring. The resulting solution is then cooled to room temperature. To the cooled starch solution add 5 ml. of 1M, pH 5.8 sodium acetate buffer. Dilute the entire mixture to 100 ml. with distilled water. An aqueous cupric sulfate solution is prepared containing 69.28 gm. $CuSO_4 \cdot 5H_2O$ per liter. An aqueous alkaline tartrate solution is prepared containing 346 gm. $KNaC_4H_4O_6 \cdot 4H_2O$ and 100 gm. NaOH per liter. An aqueous potassium iodide solution is prepared containing 300 gm. KI per liter. An aqueous sulfuric acid solution is prepared containing 266.8 gm. $H_2SO_4$ per liter. An aqueous thiosulfate solution is prepared containing 12.41 gm. $Na_2S_2O_3 \cdot 5H_2O$ per liter.

Beta-amylase is extracted from the soy material by preparing an aqueous suspension of 3.0 gm. of soy material and 30 ml. of distilled water. The aqueous suspension is then mixed for 30 minutes with a magnetic stirrer. The supernatant liquid containing the enzyme is collected by centrifuging the aqueous suspension at 15,000 RPM for 15 minutes. The supernatant enzyme solution employed in the assay procedure should have a concentration such that 1 ml. will produce reducing sugars equivalent to about 7 mg. of glucose in the assay procedure.

A 4 ml. portion of the starch substrate is placed in a reaction test tube and another 4 ml. portion in a separate blank test tube. Both tubes are then equilibrated in a water bath at 50°C. for 5 minutes. At zero time, 1 ml. of the enzyme solution to be assayed is rapidly added to the reaction test tube and swirled to mix the substrate and the enzyme. After incubation for exactly 6 minutes, 2 ml. of the alkaline tartrate solution are added to both test tubes, after which 1 ml. of enzyme solution is added to the blank test tube. Exactly 2 ml. of the cupric sulfate solution are added to both test tubes, after which said tubes are capped and heated for 10 minutes in a boiling water bath. Both tubes are then cooled to room temperature under running tap water, and 2 ml. of the potassium iodide solution and 3 drops starch substrate are added to each tube. 2 ml. of sulfuric acid solution are then added to the reaction test tube and titration of the liberated iodine is immediately begun with the thiosulfate solution on a vibrating mixer. Titration is continued slowly until the blue color has disappeared. The blue color should not return within 1 minute. This produces the reaction titer, 2 ml. of sulfuric acid solution are then added to the blank test tube and titration with the thiosulfate solution is repeated to obtain a blank titer. The titer for reducing sugar produced is equal to the blank titer minus the reaction titer.

The amount of reducing sugars liberated in the reaction tube is then computed from a calibration curve in which glucose is used as the standard sugar. The beta-amylase activity is calculated as follows:

$$\text{Beta-amylase units/ml.} = \frac{\text{Mg. sugar (as glucose)} \times \text{dilution}}{100}$$

One beta-amylase unit is defined as the amount of enzyme which will catalyze, under the assay conditions, the production of reducing sugar (maltose) which is the equivalent to the reducing power of 100 mg. of glucose in 6 minutes.

The nitrogen solubility index (NSI) of the soy materials used as starting materials in this process is determined in the following manner. The soy material is ground to a fine flour such that at least 95 percent of the sample will pass through a No. 100 U.S. Standard Screen. An aqueous suspension of the ground soy material is prepared by suspending 5 gm. of the sample in 200 ml. of distilled water. The mixture is then stirred with a mechanical stirrer at 120 RPM for 2 hours at 30°C. 2 drops of antifoam and distilled water sufficient to dilute the mixture to 250 ml. are then added, and after thorough mixing, the mixture is allowed to stand a few minutes. About 40 ml. of the supernatant liquid is decanted and centrifuged at 1500 RPM for 10 minutes, after which the supernatant is decanted through a funnel containing a glass wool plug to obtain a clear filtrate. 25 ml. of the clear filtrate is then pipetted into a Kjeldahl flask, and the amount of protein therein is determined by following the standard practice for protein determination as published in the A.O.C.S., Method Ac4-41. The percent total nitrogen content of the soy starting material is then determined using the same method. The nitrogen solubility index is calculated as follows:

$$\text{nitrogen solubility index (NSI), \%} = \frac{(B-S) \times N \times 0.014 \times 10^4}{\text{percent total nitrogen} \times \text{wt. of sample}}$$

where $B$ = ml. of alkali back titration of blank
$S$ = ml. of alkali back titration of sample
$N$ = normality of alkali We have found that the functional properties of selected leguminous materials can be greatly enhanced by pulverizing defatted legume to an average particle size below about 14 microns. Preferably, the average particle size should be reduced to below about 10 microns. Most preferably, the average particle size should be less than about 8 microns. Filaments produced from leguminous material having an average particle size much greater than about 14 microns are weak, fragile and lack cohesive qualities. Generally, if filaments are produced at all, they cannot be formed into tow of filaments and stretched.

In order to extract the proteins and carbohydrates, the pulverized leguminous material is suspended in water at a concentration from about 5 to about 15 percent (weight/volume basis) based upon the total volume. Preferably, the concentration is about 10 percent (weight/volume basis). Lower concentrations are undesirable for economic reasons and higher concentrations result in an excessively thick medium. The proteinaceous suspension, containing soluble and insoluble proteins, carbohydrates, minerals and fibrous material, is then agitated at room temperature for about 5 to about 60 minutes at an unadjusted pH somewhat below 7, i.e., about 6.6 to 6.8. The particular extraction time will depend upon the specific concentration and temperature of the proteinaceous suspension. In general, the higher the temperature, the shorter the extraction time, and the higher the concentration, the longer the extraction time. It is most important that the particular combination of conditions selected does not denature the protein to cause loss of protein functionality and production of undesirable flavors.

To protect the leguminous material from undue oxidation, it is desirable to add an antioxidant to the aqueous extraction media prior to suspending the pulverized leguminous material. Preferably, an antioxidant such as sodium sulfite is added at a concentration of about 0.1 – 1.0 weight percent based upon the weight of leguminous material.

Following the extraction of proteins and carbohydrates from the pulverized leguminous material, the protein is precipitated from the aqueous suspension on and into the insoluble portion of the leguminous material by adjustment of the pH of the suspension to or near the isoelectric point of the protein by the addition of an acceptable food grade acid. A strong acid, such as sulfuric acid, phosphoric acid, citric acid and the like, is preferred to achieve the desired pH conditions. A pH outside of the isoelectric range may increase protein solubility and result in loss of protein. The isoelectric pH of soybean protein is about 4.4 to about 4.6. Preferably, the pH is about 4.5 for soybean protein. Under optimum pH conditions, the precipitation of protein occurs rapidly and is usually complete in less than 30 minutes.

The fresh solids, containing water insoluble and acid precipitable protein fractions, as well as insoluble carbohydrate, fibrous material, and minerals, are collected in any conventional manner such as centrifugation. The liquid portion, containing acid soluble protein and water soluble carbohydrates, is separated from the fresh solids and put aside for further processing prior to being discarded as waste. The moist cake of freshly separated solids contains about 60 to 70 percent water.

Occasionally, a particular leguminous material will contain water soluble carbohydrates which are difficult to separate from the protein precipitate. In these instances it is preferred to prepare a second aqueous suspension of the freshly separated solids containing about 20 percent protein material (dry weight/volume basis) based upon the total volume. The second aqueous suspension will usually have an unadjusted pH at or near the isoelectric pH of the leguminous material. If the pH of the second aqueous suspension falls outside of the isoelectric range, the pH may be readjusted with any acceptable food grade acid as described above. After agitating the second aqueous suspension for a time sufficient for extraction of the residual carbohydrates, the fresh solids are separated from the liquid portion containing residual carbohydrates by the conventional method described above.

Spinning dopes are prepared from the moist, freshly separated solids by adding sufficient water to reduce the solids content to a value from about 17.0 to about 22 percent solids (dry weight/volume basis) based upon the total volume. The pH of the slurry thus produced is adjusted to a value from about 12.0 to about 13.2 by the addition of an acceptable food grade base. Preferably, the pH is adjusted to a value from about 12.4 to about 13.0. Any strong base solution, such as 20 to 30 percent sodium hydroxide, potassium hydroxide, ammonium hydroxide or the like, is preferred to achieve the desired pH conditions.

Following the addition of base, the viscosity of the slurry increases rapidly, i.e., in less than 1 minute, to a constant spinnable viscosity in the range of 50,000 to 100,000 centipoise. The viscosity of the spinning dope thus produced will depend upon the specific combination of protein concentration and pH. In general, protein concentrations below about 17.0 weight percent solids content and a pH below about 12.0 result in low spinning dope viscosities and produce weak, fragile proteinaceous filaments which cannot be formed into continuous strands and stretched. On the other hand, a pH above about 13.2 results in high spinning dope viscosities and in loss of functional protein. In the desired pH and solids concentration range, constant spinnable viscosities are achieved in less than 1 minute and the functional properties of the protein are retained.

After the spinning dope reaches a constant spinnable viscosity, it is forced through a porous membrane, such as a spinneret used in the production of rayon, into an acid and salt coagulating bath. Usually the coagulating bath consists of a mixture of phosphoric acid and sodium chloride. The streamlets coming through the spinneret are precipitated in the form of filaments. The spinneret is actually a small die having from perhaps 5,000 to 15,000 holes, each on the order of 0.003 to 0.01 inch in diameter. It is possible to have a plurality of spinnerets producing filaments from the spinning solution. Such spinnerets may have the same or different diameter holes, making it possible to directly produce tows of filaments having the same or different diameters. Upon stretching, the filaments or tows are elongated, and the individual filaments are reduced in diameter to an average thickness of the order of 20 to 40 microns.

The proteinaceous filaments produced by this process have the desirable characteristics of elasticity, extensibility and tensile strength which duplicate the similar chewy and resilient characteristics of real meat. Tows or bundles of the filaments may be combined with various flavoring, coloring and binder components to produce excellent analogs simulating natural meat, fish or fowl portions.

The following examples describe in further detail the process of the present invention and are not intended

EXAMPLE I

A sample of Hizyme-280, a soy flour commercially available from Central Soya, was selected and analyzed for protein content, beta-amylase activity and nitrogen solubility index. The selected Hizyme-280 had a protein content of 50 percent, a beta-amylase activity of 18.8 units/gram and a nitrogen solubility index of 75 percent. Five hundred grams of the selected soy flour were pulverized to an average particle size in the range of about 4 to about 8 microns. The pulverized soy flour was suspended in 5 liters of tap water at room temperature and agitated for 15 minutes to extract proteins and carbohydrates. The pH of the aqueous suspension was adjusted to about 4.5 by the addition of sulfuric acid to precipitate the protein on and into the insoluble portion of the soybean material. The precipitation was complete in about 10 minutes and the solids were separated by centrifugation from the liquid. The freshly separated solids were reslurried in 2.5 liters of tap water at room temperature and agitated to extract residual carbohydrates. Again the solids were separated by centrifugation from the liquid. An aqueous slurry was prepared by adjusting the solids content of the moist freshly separated solids to about 20 percent (weight/volume basis) by the addition of water. The pH of the slurry was adjusted to about 12.4 by the addition of 20 percent sodium hydroxide solution to produce a spinning dope which developed maximum spinnable viscosity in less than one minute. The spinning dope was then forced through a spinneret having a uniform orifice diameter of 0.01 inch and into a phosphoric acid-sodium chloride coagulating bath to produce filaments. The resulting filaments were capable of being extended by approximately 100 percent of their original length and capable of resisting deformation after moderate pressures were applied. When placed in the mouth and masticated, the filaments exhibited the same chewy and resilient characteristics of real meat.

EXAMPLE 2

This example illustrates the effect of beta-amylase activity and nitrogen solubility index (NSI) of the original soy flour on the quality of fiber produced in accordance with the present process. Commercially available samples of soy flour were obtained and analyzed for beta-amylase activity and nitrogen solubility index (NSI) in the same manner described above. From each of the commercially available samples of soy flour, wet-spun fibers were produced in the manner described in Example 1.

The functional qualities of the fibers produced in accordance with the procedure of this example were examined and compared with the functional qualities of fiber produced from soy isolate in the conventional manner. The results obtained from this comparison can be found in the following Table I.

Table 1

| Soybean material | B-amylase Units/gram | NSI percent | Spinning Dope pH | Fiber Quality Elasticity | Extensibility |
|---|---|---|---|---|---|
| Hizyme-280[1] | 20.9 | 78 | 12.7 | excellent | 100% stretch |
| Hizyme-280 | 18.8 | 75 | 12.4 | excellent | 100% stretch |
| Hizyme-280 | 16.6 | 77 | 12.7 | good | 100% stretch |
| Hizyme-280 | 16.0 | 77 | 12.6 | good | 100% stretch |
| Hizyme-280 | 12.0 | 74 | 12.9 | weak | less than 25% stretch |
| Soy Fluff 200-W[2] | — | 66.2 | 12.5 | good | less than 25% stretch |
| Soy Fluff 200-T[3] | — | 18.8 | 12.6 | no fiber | no fiber |
| Edi-Pro-A[4] | 0.0 | — | 12.5 | excellent | 100% stretch |

[1] Hizyme 280: Soy flour available from Central Soya.
[2] Soy Fluff 200-W: Soy flour available from Central Soya.
[3] Soy Fluff 200-T: Toasted Soy flour available from Central Soya.
[4] Edi-Pro-A: Soy isolate available from Ralston Purina.

From the results shown in the above table, it can be seen that the quality of fiber is very much dependent on the amount of original beta-amylase activity and nitrogen solubility index (NSI) of the soy flour. To produce fiber, the soy flour must have a nitrogen solubility index (NSI) of about 66 percent. To produce better fiber, the soy flour must have an activity of at least 12 beta-amylase Units/gram and a nitrogen solubility index (NSI) of about 66 percent. However, to produce highly acceptable fiber, the soy flour must have an activity of at least 16 beta-amylase Units/gram and a nitrogen solubility index of at least 74 percent. At an activity above 16 beta-amylase Units/gram and a nitrogen solubility index (NSI) above 74 percent, the fibers so produced are as good as the wet-spun fibers produced from soy isolate in the conventional manner.

EXAMPLE 3

This example illustrates the effect of particle size of the soy flour on the quality of fiber produced in accordance with the present process. Five hundred gram quantities of Hizyme-280, a soy flour available from Central Soya having a beta-amylase activity of 20.0 U/gm and a nitrogen solubility index of 78 percent, were pulverized in a micronizer to various average particle sizes. Average particle sizes were determined by microscopic evaluation. From each of the pulverized samples of Hizyme-280, wet spun fibers were produced in the manner described in Example 1.

The functional qualities of the fibers produced in accord with the procedure of this example were compared and the results obtained may be found in the following Table II.

Table II

| Hizyme 280, average particle size, microns | Spinning Dope pH | Fiber Quality | | |
|---|---|---|---|---|
| | | Elasticity | Extensibility | Tensile strength |
| 40–50 soy flour as is | 12.9 | fair | less than 25% stretch | fair |
| 14–16 | 12.9 | fair | less than 25% stretch | fair |
| 10–14 | 12.9 | low good | 25–50% stretch | good |
| 8–12 | 13.0 | good | 75% stretch | good |
| 4–6 | 12.8 | high good | 100% stretch | high good |
| 3–6 | 13.0 | high good | 100% stretch | high good |
| 2–6 | 13.0 | high good | 100% stretch | high good |

From the results shown in the above Table, it is readily seen that the fiber quantities are dependent upon the particle size of the soy flour. As can be seen a desirable change in fiber quality occurs when the average particle size of the soy flour is reducced to below about 14 microns. Further improvement is obtained when the average particle size is reduced to below about 10 microns. And, highly acceptable fibers are obtained when the average particle size is reduced to below about 8 microns.

EXAMPLE 4

This example illustrates the effect of directly using soy flour, i.e., about 50 percent protein, and soy concentrate, i.e., at least 70 percent protein, without other processing steps on the quality of fiber produced in the conventional manner. Commercially available samples of soy flour (Central Soya Hizyme-280, having a beta-amylase activity of 20.0 Units/gram and a nitrogen solubility index of 78%) and soy concentrate (Griffith GL-301, having no beta-amylase activity and a nitrogen solubility index of 12%) were pulverized to the average particle size ranges described in Example 3. From each of the ground sample particle size ranges, 500 grams of material were suspended in 2.5 liters of water. The pH was adjusted to about 12.8 to 13.0 by the addition of 20 percent sodium hydroxide solution. Spinnable viscosities in the range of 50,000 to 100,000 centipoise were not obtained. When the spinning solution was forced through the spinneret into the phosphoric acid-sodium chloride coagulating bath, no fibers were produced. This result clearly indicates that fibers cannot be produced in the conventional manner directly from relatively low purity soy flours or soy concentrate even when pulverized to the desired particle size ranges described.

We claim:

1. A process for preparing wet spun proteinaceous filaments which comprises:
   a. forming an aqueous first slurry of a pulverized, functional, low purity, defatted leguminous material having a protein content on a dry weight basis of about 45 to 55 percent;
   b. adjusting the pH of said slurry to about the isoelectric pH of the leguminous protein to precipitate the protein on and into the insoluble portion of the leguminous material;
   c. separating the solids from the liquid portion of said slurry;
   d. forming an aqueous second slurry of said separated solids;
   e. adjusting the pH of said second slurry to an alkaline pH from about 12.0 to 13.2 to produce a spinning dope having spinnable viscosity; and
   f. forcing said spinning dope through a spinneret and into a coagulating bath to form proteinaceous filaments.

2. A process according to claim 1 wherein the leguminous material has a nitrogen solubility index of at least 60 percent.

3. A process according to claim 1 wherein the leguminous material has a beta-amylase activity of at least about 10 beta-amylase Units per gram.

4. A process according to claim 1 wherein the leguminous material has an average particle size of less than about 14 microns.

5. A process according to claim 1 wherein the leguminous material has a protein content on a dry weight basis of about 45 to 55 percent and a nitrogen solubility index of at least 60 percent, said material having an average particle size of less than about 14 microns.

6. A process according to claim 1 wherein the leguminous material has a protein content on a dry weight basis of about 45 to 55 percent, a nitrogen solubility index of at least 60 percent and a beta-amylase activity of at least 10 beta-amylase Units per gram, said material having an average particle size of less than about 14 microns.

7. A process according to claim 6 wherein the aqueous first slurry contains the pulverized functional defatted leguminous material at a solids concentration from about 5 to about 15 percent (dry weight by volume basis) based upon the total volume; the aqueous second slurry contains said separated solids at a solids concentration from about 17 to about 22 percent (dry weight by volume basis) based upon the total volume; and the pH of said second slurry is adjusted to about 12.0 to about 13.2.

8. A process according to claim 1 wherein the leguminous material has a protein content on a dry weight basis of about 45 to 55 percent, a nitrogen solubility index of at least 66 percent and a beta-amylase activity of at least 12 beta-amylase Units per gram, said material having an average particle size of less than about 10 microns.

9. A process according to claim 1 wherein the leguminous material has a protein content on a dry weight basis of about 45 to 55 percent, a nitrogen solubility index of at least 74 percent and a beta-amylase activity of at least 16 beta-amylase Units per gram, said material having an average particle size of less than about 8 microns.

10. A process for preparing wet spun proteinaceous filaments, which comprises:
   a. forming an aqueous first slurry containing a pulverized, functional defatted leguminous material having a protein content on a dry weight basis of about 45 to 55 percent, a nitrogen solubility index of at least 66 percent and a beta-amylase activity of at least 12 beta-amylase Units per gram, said material having an average particle size of less than about 10 microns, at a solids concentration from about 5 to about 15 percent (dry weight by volume basis) based upon the total volume;
   b. adjusting the pH of the aqueous first slurry to about 4.4 to about 4.6 to precipitate the protein on and into the insoluble portion of the leguminous material;

c. separating the solids from the liquid portion of the aqueous first slurry;

d. forming an aqueous second slurry containing said separated solids at a solids concentration of about 20 pecent (dry weight by volume basis) based upon the total volume;

e. separating the solids from the liquid portion of the aqueous second slurry;

f. forming an aqueous third slurry of said separated solids at a solids concentration from about 18 to about 20 percent (dry weight by volume basis) based upon the total volume;

g. adjusting the pH of the aqueous third slurry to about 12.4 to about 13.0 to produce a spinning dope having spinnable viscosity; and h. forcing the spinning dope through a spinneret and into a coagulating bath to form proteinaceous filaments.

11. A process according to claim 10 wherein the leguminous material is soybean having a protein content on a dry weight basis of about 50 percent, a nitrogen solubility index of at least 74 percent, and a beta-amylase activity of at least 16 beta-amylase Units per gram, said soybean material having an average particle size less than about 8 microns.

12. A process according to claim 10 wherein the aqueous first slurry also contains sodium sulfite at a solids concentration of about 0.1 to 1.0 weight percent based upon the weight of leguminous material.

* * * * *